(12) United States Patent
Froger et al.

(10) Patent No.: US 8,602,315 B2
(45) Date of Patent: Dec. 10, 2013

(54) MOLDED CHIP CARD AND METHOD FOR MANUFACTURING SAME

(75) Inventors: Alexis Froger, Meudon (FR); Jeremy Renouard, Meudon (FR); Laurent Oddou, Meudon (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/521,614

(22) PCT Filed: Jan. 11, 2011

(86) PCT No.: PCT/EP2011/050241
§ 371 (c)(1),
(2), (4) Date: Jul. 11, 2012

(87) PCT Pub. No.: WO2011/083171
PCT Pub. Date: Jul. 14, 2011

(65) Prior Publication Data
US 2012/0286050 A1 Nov. 15, 2012

(30) Foreign Application Priority Data

Jan. 11, 2010 (EP) .................................. 10305026

(51) Int. Cl.
*G06K 19/06* (2006.01)
(52) U.S. Cl.
USPC ........... 235/492; 257/679; 257/684; 257/701; 257/702
(58) Field of Classification Search
USPC .................... 235/492; 257/679, 684, 701, 702
See application file for complete search history.

(56) References Cited

U.S. PATENT DOCUMENTS

| 5,894,006 | A  | * | 4/1999  | Herbst .......................... 264/132 |
| 6,333,113 | B2 | * | 12/2001 | Sugie et al. .................... 428/412 |
| 6,350,530 | B1 | * | 2/2002  | Morikawa et al. ............. 428/480 |
| 6,372,331 | B1 | * | 4/2002  | Terada et al. .................. 428/212 |
| 7,199,456 | B2 | * | 4/2007  | Krappe et al. ................. 257/679 |
| 8,157,086 | B1 | * | 4/2012  | Gallegos et al. .............. 206/232 |
| 2002/0094444 | A1 | * | 7/2002 | Nakata et al. ................. 428/480 |
| 2003/0101630 | A1 | * | 6/2003 | Garcia et al. .................... 40/658 |
| 2003/0132302 | A1 | * | 7/2003 | Hattori .......................... 235/492 |
| 2006/0226240 | A1 | * | 10/2006 | Singleton ..................... 235/492 |
| 2008/0084312 | A1 |   | 4/2008 | Daily |
| 2008/0135625 | A1 | * | 6/2008 | Waschk ........................ 235/492 |
| 2008/0277481 | A1 |   | 11/2008 | Engel et al. |
| 2009/0065138 | A1 |   | 3/2009 | Engel et al. |
| 2009/0191393 | A1 | * | 7/2009 | Lu ................................. 428/220 |
| 2009/0294535 | A1 | * | 12/2009 | Paeschke et al. ............. 235/439 |

FOREIGN PATENT DOCUMENTS

| DE | 202005010717 U1 | 11/2005 |
| EP | 0694874 A2 | 1/1996 |
| EP | 0750015 A2 | 3/1996 |

OTHER PUBLICATIONS

PCT/EP2011/050241, International Search Report, Mar. 25, 2011, European Patent Office, P.B. 5818 Patentlaan 2 NL—2280 HV Rijswijk.

\* cited by examiner

*Primary Examiner* — Allyson Trail
(74) *Attorney, Agent, or Firm* — The Jansson Firm; Pehr B. Jansson

(57) ABSTRACT

The invention relates to a chip card comprising, a molded card body made by means of injection molding and, an integrated circuit chip, as well as to a method for manufacturing such a card. The invention is characterized in that the card body includes polyacrylic acid. The invention applies to SIM cards in particular.

17 Claims, No Drawings

MOLDED CHIP CARD AND METHOD FOR MANUFACTURING SAME

AREA OF THE INVENTION

This invention relates to the area of smart cards. It relates to smart cards that comprise, firstly, a moulded card body made by means of injection moulding, and secondly, an integrated circuit chip. It further concerns a method for manufacturing such smart cards. In particular, the cards concerned by this invention are subscriber identification module cards, or SIM cards. SIM cards are designed to be incorporated into mobile telephones. They identify a subscriber to a supplier of services in a cellular type telecommunication network.

PRIOR ART

Smart cards are standardised portable electronic objects that include a card body and a chip with an integrated circuit.

The card body substantially takes the shape of a fine rectangular parallelepiped.

If the card is a SIM card, the card body is pre-cut to demarcate a smaller inner card, called the mini card. That mini card is attached to the card body by tabs. The tabs can be broken off so that the mini card can be separated from the rest of the card body and then incorporated into mobile telephones that accept the mini card format. As with cards in conventional format with no mini card, the dimensional characteristics of mini cards are standardised.

The integrated circuit chip is generally incorporated in an electronic module or a micromodule. This module has contacts that are flush with the surface of the card body. The position of the contacts is itself standardised.

Smart cards are generally manufactured by laminating or by injection moulding.

To manufacture cards by laminating, extruded plastic sheets are assembled when hot so as to obtain a bonded sheet that makes up the card body. In one example, the bonded sheet comprises six sheets, two of which are external coating sheets called overlays. The module may for example be incorporated in the card body at a later stage, after a cavity is made in the said body, particularly by milling. If the card body is pre-cut to define a mini card, that pre-cut is achieved by shaping or with a pre-cutting tool such as a laser beam, a high-pressure jet or a punching type mechanical tool.

In practice, the adjustment of smart card manufacturing methods using lamination is relatively simple. However, the implementation of smart card manufacturing using lamination is complicated as it requires several stages, including those mentioned above to make the cavity for placing the module.

On the other hand, the adjustment of smart card manufacturing methods using injection moulding is tricky. That is because the height of the internal cavity of the moulds—substantially in the size of the card—is particularly small in relation to the other dimensions. The injected plastic must be spread evenly in the totality of the cavity of the mould, particularly in the gaps that form the fixing tabs of a mini card, if the card to be manufactured comprises a mini card, or vertically from a mould core designed to form a cavity for the subsequent placement of the module, within a very small thickness of the mould cavity, well below the 0.76 mm that represents the standardised minimum thickness of a card body. If the material does not spread evenly in the mould cavity, then the cards made by moulding are incomplete. Further, the material needs to be injected at high temperatures, particularly above 150° C., and under pressure, for example at pressure above 1000 bars, without the card made having appearance defects. Many known materials are not injectable in these conditions and the appearance of the card bodies made is not satisfactory. For example, with some materials, or even some materials in some injection conditions, the cards made have appearance defects such as shrink marks or ribs. In other cases, infiltrations can be seen between the different parts of the mould. That is why only a minority of companies currently have enough expertise to make cards by injection moulding. Lastly, in the case of SIM cards in particular, the card body made by injection moulding must withstand high temperatures, 85° C. in practice. They must further offer appropriate resistance to humidity. In practice, the SIM cards must not be damaged even when the humidity inside the telephone is 93%.

In view of the constraints above, the SIM cards of the prior art are today essentially made of ABS (acrylonitrile butadiene styrene).

But ABS has a major drawback. In the terms of this description of the invention, this product cannot be called 'green', meaning a product that is biodegradable to a certain extent. As a result, cards made of ABS are not damaged after use or at least not substantially. With SIM cards containing a detachable mini card, once the mini card is separated from the remainder of the card body, that remainder is disposed of and does not degrade.

So-called 'green' cards made with plastics that are biodegradable have indeed been made by lamination, particularly in document EP 1 862 507 A1. However, these cards are laminated cards and as explained earlier, the materials used for manufacturing laminated cards cannot be used to manufacture injection moulded cards, and there is currently no known green card made by injection moulding, particularly no green SIM card, that offers sufficient resistance to heat and humidity for use in mobile telephones according to the specifications required by suppliers of mobile telephone services.

SUMMARY OF THE INVENTION

In view of the foregoing, the invention aims at solving one problem of making injection moulded green cards, particularly SIM cards that resist high temperature, particularly 85° C. and high humidity, particularly 93%.

The solution to that problem presented in the invention firstly relates to a smart card comprising (a) a moulded thermoplastic card body made by means of injection moulding, and (b) an integrated circuit chip, characterised in that the said card body contains polylactic acid.

Secondly, the invention relates to a method for manufacturing a smart card, comprising (a) a card body and (b) an integrated circuit chip, characterised in that it comprises the following steps in which:
  a mould with a cavity for the card body is supplied;
  a material containing polylactic acid is supplied;
  the material is injected in the mould; and
  the card body injected in that way is removed from the mould.

Advantageously, —the card body contains over 40% polylactic acid by weight of the total weight of the said body; —the card body further contains copolymer; —the card body contains no more than 60% copolymer by weight; —the copolymer is a copolyester; —the card body further contains a dye; —the dye contains titanium dioxide; —the fluidity of the material injected for making the card body ranges from 8 to 20 g/10 min MFI; —the card is a subscriber identification module and the card body has pre-cuts demarcating a detachable mini card; and the injection temperature is above 150° C. and the injection pressure is greater than 1000 bars.

The invention will be better understood in the description below of non-limitative examples of embodiment.

DETAILED DESCRIPTION OF THE INVENTION

Smart cards according to the invention comprise a card body and a chip with an integrated circuit.

The card body substantially takes the shape of a fine rectangular parallelepiped. The dimensions of the card body are defined by standards ISO 7810, ISO 7816, and the GSM standards established by ETSI, particularly ETSI TS 102 221. Those dimensions are as follows: 85.60 mm long, 53.98 mm wide, with thickness 0.76 mm. If the card is a SIM card, then the card body, with the aforementioned dimensions, is pre-cut to demarcate a smaller inner card or mini card. That mini card is attached to the card body by tabs. The tabs can be broken off so that the mini card can be separated from the rest of the card body and then incorporated into mobile telephones that accept the mini card format. As with cards in conventional format with no mini card, the dimensional characteristics of mini cards are defined in the aforementioned standards.

The card body according to the invention is moulded and is made by injection moulding. It is thus different from laminated card bodies that are made by laminating. Card bodies made by injection moulding form single pieces, whereas card bodies made by lamination are made up of a bonded sheet formed with stacked sheets, which may be differentiated from each other in the finished card body. Further, card bodies made by injection moulding generally bear traces of injection points, particularly on the edges of the card body.

In the invention, the card body made by injection moulding contains polylactic acid or PLA. PLA is a known biodegradable thermoplastic, which may be derived from sugarcane or corn starch, for example. PLA is biodegradable. In one example of embodiment, the PLA is a mixture containing 90% PLA by weight of the total weight of the said mixture, the mixture being distributed by Ceraplast™ under the description Compostable 1001 with a Vicat point of 93° C. and a vitreous transition temperature of −28° C.

Preferentially, the card body is thermoplastic and contains more than 40% PLA by weight of the total weight of the said body. More preferentially, the card body contains 50 to 80% PLA by weight.

Preferentially, the card body further contains no more than 60% copolymer by weight of the total weight of the said body, the copolymer being preferentially a copolyester. More preferentially, the card body contains 15 to 50% copolymer of that type by weight. For example, the copolymer is an aliphatic copolyester distributed by Natureplast™ under the description PBI03 with a Vicat point of 44° C. and vitreous transition temperature Tg of 55° C.

Advantageously, the card body further includes a dye, for example mineral filler designed to give the injection-moulded card body a white colour. The mineral filler may for example be titanium dioxide, TiO2, accounting for 60% by weight of the dye.

The fluidity of the injected material for making the card body ranges from 8 to 20 g/10 min MFI (Melt Flow Index— standardised values NFT 51-016 and 620, ISO 1133). Above 20 g/10 min MFI, infiltrations of the mixture containing PLA can be observed. Below 8 g/10 min MFI, injection is difficult or even impossible, and some injected cards are incomplete or have appearance defects. It may be noted that the fluidity given in MFI is substantially independent of the temperature or injection pressure of the material.

For making the cards according to the invention, a mixture is first prepared. The mixture contains PLA, advantageously a copolymer, in practice a copolyester and a dye, in the aforementioned quantities.

The mixture is heated, brought to a temperature above 150° C., for example approximately 200° C.

The fluidity of the mixture containing PLA is specifically determined to range from 8 and 20 g/10 min MFI. Thus, this material containing PLA spreads evenly in the mould, possibly under the core that defines the cavity of the mould, with no mini waves upon injection against the walls of the mould or other disturbances that could lead to appearance defects in the card.

The mixture with the aforementioned fluidity is then injected under pressure that is generally above 1000 bars in the mould. Such moulds are particularly disclosed in documents WO03/021526A1 or EP1857969A2, the content of which is incorporated into this description, by a reference quotation.

The material injected in the mould is cooled and the card body is extracted, in practice ejected from the mould.

A module with an integrated circuit chip is then placed in the cavity of the card body. It may for example be glued into the cavity.

Unlike ABS, the mixtures used in the invention show low shrinkage.

The cards made, particularly the card bodies, contain PLA and are green or even biodegradable. They are made of materials that are partly derived from renewable resources, at least 36% based on the aforementioned PLA/copolyester ratios. They can be easily recycled and composted and may be incinerated without the discharge of toxic fumes. The card bodies according to the invention thus make it possible that at the end of its life, the product does not pollute the soil or the atmosphere. In particular, once the mini card is detached from its support, the remainder of the card can be recovered and recycled.

Example 1

Biodegradable SIM Cards

A mixture was prepared containing:
74% material distributed by Ceraplast™ under the description INJ1001EZC, including 90% PLA by weight, which PLA is made from corn starch;
24% 100% biodegradable copolyester distributed by Natureplast™ under the description PIB03; and
2% (by weight) white dye Polyone™ made with TiO2.

The mixture was brought to a temperature of 210° C. then injected at a pressure of 1220 bars in the cavity of a mould designed for making moulded card bodies with a detachable mini card.

The fluidity of the mixture was approximately 12 g/10 min MFI.

A module with an integrated circuit chip was then placed in the cavity of the card body.

The card made was a green card—in the meaning of this description of the invention—and was biodegradable.

Temperature and heat resistance tests were carried out. They showed that the cards obtained were highly resistant to temperature of 85° C., with 93% humidity for a given time. Further, the said cards had properties appropriate for the GSM application.

The invention claimed is:

1. A smart card comprising (a) a moulded thermoplastic card body made by injection moulding, and (b) an integrated circuit chip, wherein the card body comprises over 40% polylactic acid by weight of a total of said body.

2. The smart card according to any of claim 1, wherein the card body further contains copolymer.

3. The smart card according to claim 2, wherein the card body comprises no more than 60% copolymer by weight.

4. The smart card according to claim 2, wherein the copolymer is a copolyester.

5. The smart card according to claim 1, wherein the card body further contains a dye.

6. The smart card according to claim 5, wherein the dye contains titanium dioxide.

7. The smart card according to claim 1, wherein fluidity of a material injected for making the card body ranges from 8 and 20 g/10 min MFI.

8. The smart card according to claim 1, wherein the smart card is a subscriber identification module and wherein the card body is pre-cut to demarcate a detachable mini card.

9. The smart card according to claim 1, wherein the smart card is biodegradable.

10. A method for manufacturing a smart card, comprising (a) a card body and (b) an integrated circuit chip, comprising:
supplying a mould defining a cavity for the card body;
supplying a material containing polylactic acid;
injecting the material into the mould; and
removing the card body produced from the injection of the material into the mould from the mould.

11. The method according to claim 10, wherein the injected material contains at least 40% polylactic acid by weight of the total weight of the said material and no more than 60% copolymer by weight of the material.

12. The method according to claim 10 or 11, wherein a fluidity of the material injected for making the card body ranges from 8 and 20 g/10 min MFI.

13. The method according to claim 10 or 11, wherein the smart card is a subscriber identification module and wherein the card body is pre-cut to demarcate a detachable mini card.

14. The method according to claim 10 or 11, wherein that the injection temperature is greater than 150° C. and in that the injection pressure is greater than 1000 bars.

15. The smart card according to claim 3, wherein the copolymer is a copolyester.

16. The smart card according to claim 2, wherein the card body further contains a dye.

17. The smart card according to claim 3, wherein the card body further contains a dye.

* * * * *